Jan. 17, 1967  W. H. BRACKBILL ETAL  3,298,695
MANURE SPREADER

Filed Feb. 23, 1965   3 Sheets-Sheet 1

INVENTORS
WARREN H. BRACKBILL
& CHARLES A. SMITH

BY *Walter V. Wright*
AGENT

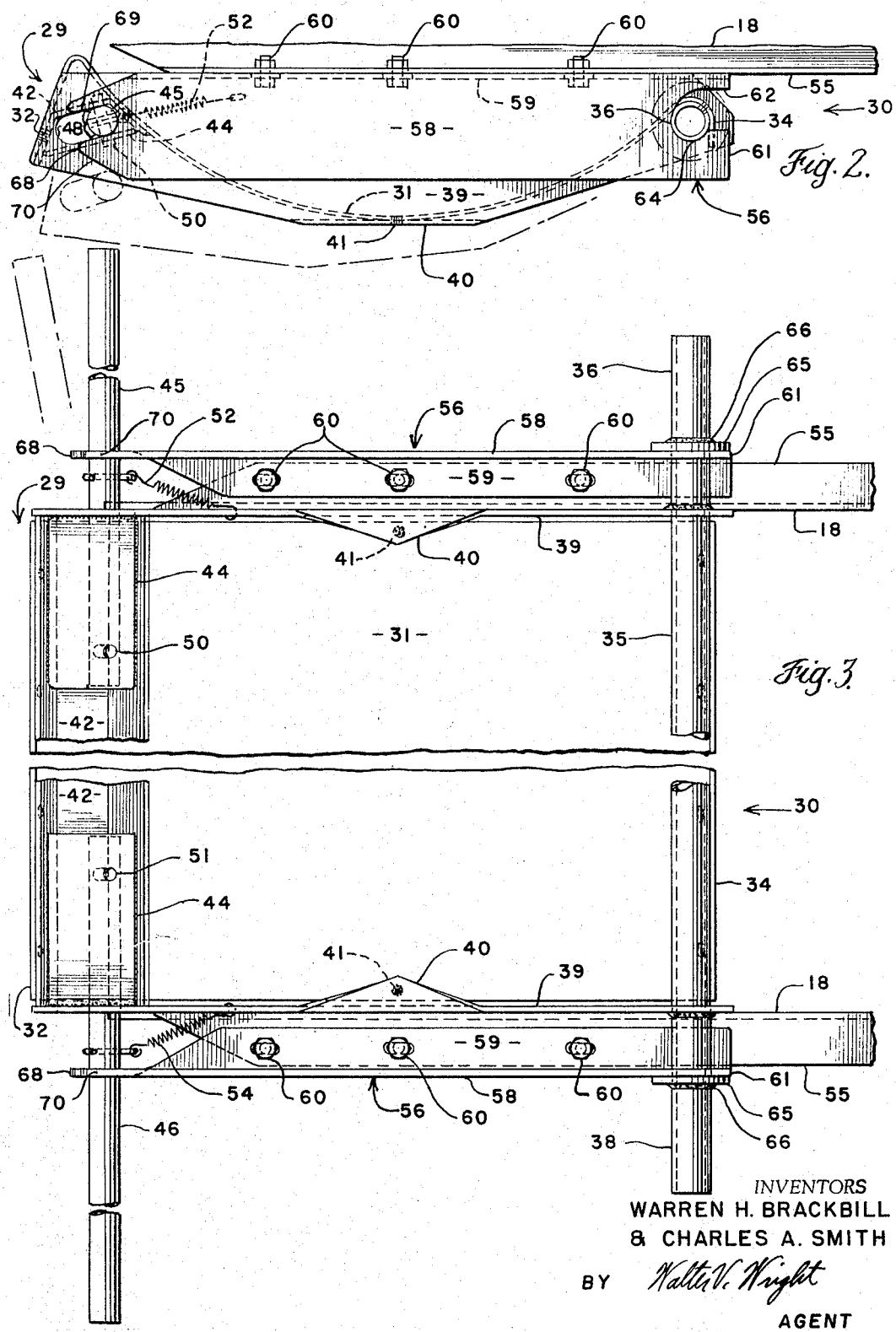

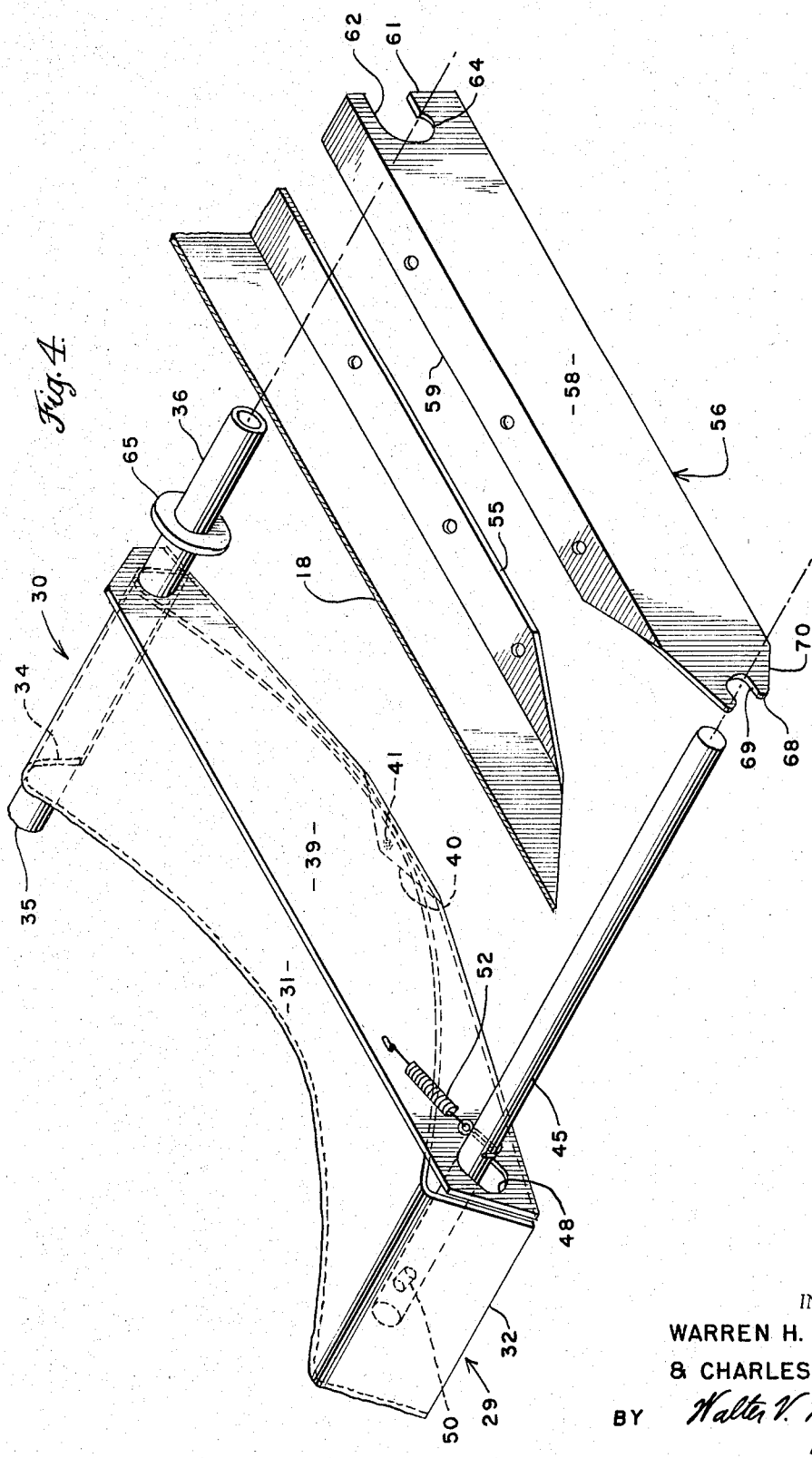

United States Patent Office 3,298,695
Patented Jan. 17, 1967

3,298,695
MANURE SPREADER
Warren H. Brackbill, Paradise, and Charles A. Smith, New Holland, Pa., assignors to Sperry Rand Corporation, New Holland, Pa., a corporation of Delaware
Filed Feb. 23, 1965, Ser. No. 434,597
6 Claims. (Cl. 275—8)

This invention relates generally to manure spreaders and the like. More specifically, it relates to the mounting of a fine material pan on a manure spreader.

Conventional manure spreaders have a wagon-like box open at the rear. The sides of the box extend rearwardly beyond the bottom and support the usual rotary scattering mechanism. A conveyor operable along the bottom of the box moves the entire load progressively rearwardly into the scattering mechanism. The scattering mechanism breaks the mass of material into fine particles and throws it rearwardly from the box. It has long been recognized that, whether the manure is in a dry or semi-fluid state, the smaller particles tend to move under the scattering mechanism and merely fall off the trailing edge of the bottom of the spreader box. Considerable material may be lost in this manner, particularly with dry poultry manure or other naturally fine textured fertilizer. The drop off loss is not always harmful after the spreader has reached the particular field that is intended to be fertilized, although it sometimes damages or smothers and burns small plants. Often, however, a considerable portion of the load may be lost on the way to the field. This loss is prevented by the use of a fine material pan.

The fine material pan extends rearwardly from adjacent the rear edge of the bottom of the spreader box under under the scattering mechanism and prevents material from dropping to the ground from the trailing edge of the box bottom without being acted upon by the scattering mechanism. At the end of a spreading operation, it is necessary to remove or release the pan to enable the spreader floor conveyor, or apron, to expel the last of the manure from the spreader box over the rear edge of the floor. It is also necessary to periodically clean the pan of dried manure that accumulated thereon. These are often difficult, unpleasant and time consuming tasks.

It is an object of this invention to provide novel apparatus for removably attaching a fine material pan to a manure spreader or the like.

It is another object of this invention to provide apparatus of the above character which enables a fine material pan to be readily pivoted downwardly to enable the spreader apron to completely empty the spreader box.

It is another object of this invention to provide apparatus of the above character which enables a fine material pan to be completely removed from the spreader in a matter of seconds without removing any bolts or other permanent type attaching means.

It is another object of this invention to provide apparatus of the above character which is mechanically simple and rugged in design.

It is another object of this invention to provide apparatus of the above character which is of low cost construction and readily attachable to existing manure spreaders.

These and other objects and advantages of this invention will be apparent upon reference to the following description and claims taken in conjunction with the accompanying drawings:

FIG. 2 is an enlarged side elevational view of the fine material pan and mounting apparatus seen in FIG. 1;

FIG. 3 is a bottom view of the structure shown in FIG. 2 with the central portion of the structure broken out to condense the figure; and FIG. 4 is a fragmentary exploded view showing the relationship of the fine material pan and its mounting bracket to a portion of one side wall of a manure spreader box.

Figure 1:
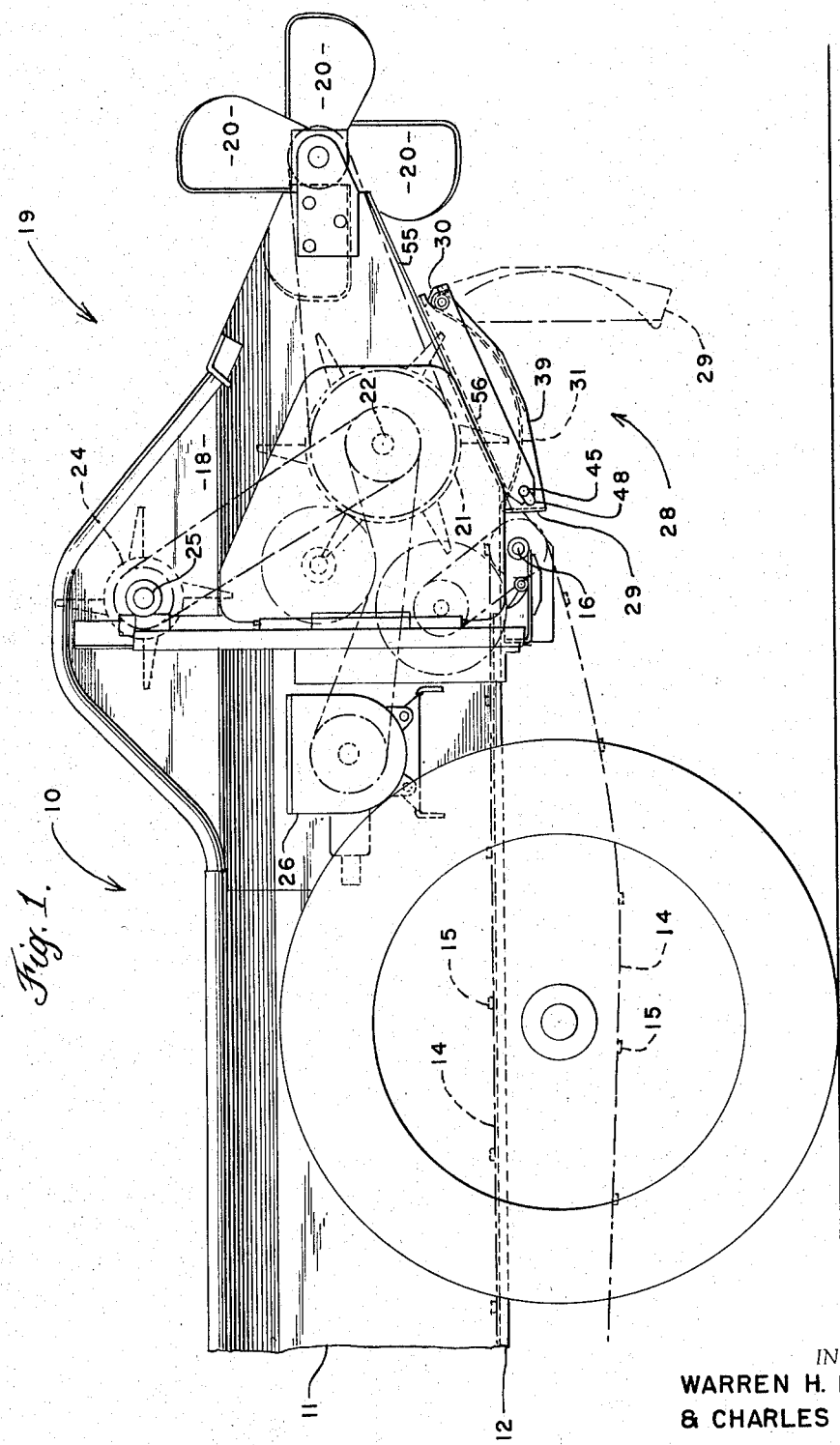
FIG. 1 is a fragmentary side elevational view of a conventional manure spreader equipped with a fine material pan mounted in accordance with the principles of the present invention.

Referring now to the drawings in detail, particularly FIG. 1, the reference numeral 10 indicates, generally, a conventional manure spreader of the type comprising a wagon-like box having sides 11 and a bottom 12. The usual floor conveyor chains 14 and inter-connecting conveyor slats 15 are shown in phantom lines. The floor conveyor chains 14 are entrained about sprockets 16 journalled at the rear terminal edge of the spreader bottom 12, to provide the conventional rearwardly moving feed run along the upper side of the spreader bottom and the forwardly moving return run on the under side of the spreader bottom. The sides 11 have extensions 18 which project rearwardly beyond the spreader bottom 12. Conventional scattering mechanism indicated generally by the reference numeral 19 is carried by, and extends between, the side wall extensions 18. Some spreaders additionally include a set of wide spread paddles 20 which intercept the stream of material discharged by the scattering mechanism 19 and spread the material laterally and rearwardly over a wide area.

Scattering mechanism 19 includes a main, or lower, scattering drum 21 carried on a shaft 22 which extends transversely between side wall extensions 18 and has its ends journalled therein. The scattering mechanism 19 may also include an upper scattering drum 24 carried by a shaft 25 extending between side wall extensions 18 and journalled thereon.

A power-take-off shaft (not shown) delivers driving power to a gearbox 26 mounted on the side 11 of the spreader box. The floor conveyor 14, the scattering drums 21 and 24 and the widespread paddles 20 are driven from gearbox 26 by various chain and sprocket drives shown in phantom lines in FIG. 1. This drive mechanism is now conventional and does not constitute a part of the present invention. A complete description thereof may be found in U.S. Patent 2,699,337.

In FIG. 1 the reference numeral 28 indicates generally, the fine material pan attachment shown in detail in FIGS. 2, 3 and 4. Pan 28 extends laterally between the side wall extensions 18 and has a leading end 29 and a trailing end 30.

Referring now primarily to FIGS. 2–4, the main body of the pan constitutes an arcuate metal sheet 31 having a down-turned flange 32 at the leading end 29 and a downwardly curled flange 34 at the trailing end 30. The trailing end flange 34 curls around a transverse pan frame rod, or tube, 35 and is fixedly attached thereto. The end portions of rod 35 project laterally beyond the sides of pan plate 31 and constitute, respectively, left and right pan pivot members 36 and 38. The lateral extremities of the pan are defined by side plates 39 suitably welded to the respective sides of metal sheet 31. The side plates 39 have central welding tabs 40 underlying sheet 31 and spot welded thereto as indicated at 41.

Underlying the turned-down flange 32 at the leading end of the pan are upper and lower gussets 42 and 44. The upper gusset 42 is actually a channel member which extends across the pan and constitutes a structural member of the pan. There are two separate lower gussets 44, one adjacent each side of the pan. Left and right side latch bars 45 and 46, respectively, have their inner ends disposed between the upper gusset 42 and the respective lower gussets 44 and extend laterally outwardly through elongated slots 48 in pan side plates 39. Pivot members 50 and 51 are carried by the respective sets of gussets and extend generally vertically therebetween and transversely through the inner end portions of the latch bars 45 and 46, respectively, thereby mounting latch bars 45 and 46 for fore-and-aft swinging movement about their respective pivots 50 and 51. Springs 52 and 54 are interconnected between the respective latch bars 45 and 46 and pan side plates 39 and yieldably urge the latch bars rearwardly about their pivot members 50 and 51.

Each of the spreader side wall extensions 18 has an outwardly turned bottom flange 55. A pair of symmetrically opposite pan mounting brackets 56 are provided for removably attaching the pan to the side wall extension flanges 55. The particular construction of the brackets 56 may best be seen in the exploded view of FIG. 4 wherein the left side bracket 56 is shown. Each of the brackets has a main vertical plate portion 58 and a right angle flange portion 59 extending inwardly from the upper edge thereof.

A series of three bolts 60 (FIGS. 2 and 3) serve to fixedly attach the brackets 56 to the spreader side wall extensions by interconnecting the bracket flanges 59 to the side wall flanges 55. The brackets 56 each have a trailing edge 61 which, as may be seen in FIG. 1, is disposed rearwardly of scattering mechanism 19. A rearwardly opening, forwardly extending generally U-shaped slot 62 is formed in the trailing edge 61 of each of the brackets 56. The laterally projecting end portions 36 and 38 of the pan frame rod 35 are readily receivable in the slots 62 from the rear. It will be apparent in FIG. 1 that the slots 62 extend downwardly and forwardly when the brackets 56 are mounted in place on the spreader. This incline is normally sufficient to maintain pivot portions 36 and 38 of rod 35 seated firmly in the slots 62 due to the force of gravity; however, it is preferable to provide an undercut 64 (FIG. 4) in the bottoms of slots 62 to receive pivot portions 36 and 38. Lateral shifting of the fine material pan is prevented by stop discs 65 welded to the ends of rod 35 at 66 (FIG. 3). The discs 65 engage the outer sides of the vertical plate portions 58 of brackets 56 as may be seen in FIG. 3. Brackets 56 extend forwardly from their trailing edges 61 to leading edges 68 disposed ahead of the axis, or shaft, 22 of main rotary scattering drum 21 as may be seen in FIG. 1. This locates the leading edge 68 closely adjacent the rear terminal edge of the spreader bottom 12. Formed in the leading edge 68 of brackets 56 are forwardly opening, rearwardly extending U-shaped slots 69 of a size to readily receive the latch bars 45 and 46 (FIGS. 2 and 3). The portion of leading edge 68 below slot 69 on each of the brackets 56 is a latch actuating cam surface 70 which is inclined upwardly toward the latching slot 69 from the bottom edge of the bracket.

Having initially bolted the brackets 56 to the spreader side extensions 18, a farmer may attach the fine material pan to the spreader by merely moving the pan forwardly to the trailing edge 61 of the brackets 56 until pivot portions 36 and 38 of the pan frame bar 35 are entered in the respective U-shaped slots 62. He then swings the pan forwardly and upwardly from the lowered inoperative position shown in phantom lines in FIG. 1 to the raised operative position shown in solid lines in FIG. 1. As the pan swings upwardly, the latch bars 45 and 46 strike cam surfaces 70 which pivot the respective latch bars forwardly in opposition to the springs 52 and 54. When the bars 45 and 46 move upwardly to the open ends of latching slots 69, the springs 52 and 54 pull the latch bars rearwardly into latching engagement with the slots. At the end of a spreading operation, when it is desired to lower the pan to the inoperative position in order that the spreader floor apron may discharge the final portion of the load, the farmer pushes forwardly on the projecting end of one of the latch bars 45 or 46. The width of the pan provides sufficient flexibility under its own weight that the forwardly disposed latch bar will drop below the open end of its respective latching slot 69. A forward push on the remaining latch bar enables the pan to swing downwardly to the inoperative position under its own weight. The latch bars 45 and 46 and the pivot portions 36 and 38 of pan frame bar 35 project laterally beyond the brackets 56 distances sufficient to enable their operation by the foot of the operator. From the inoperative position shown in FIG. 1 if it is desired to completely remove the pan from the spreader for cleaning with a hose or the like, the operator merely pushes the pivots 36 and 38 rearwardly out of U-shaped slots 62. From the above it will be apparent that the time required for operation of the fine material pan has been reduced to a matter of seconds, even including complete removal of the pan from the spreader. The location and manipulation of bolts or the like is eliminated. The pan need only be handled by hand to install it on the spreader after it has been cleaned. The pan may also be cleaned while it is hanging on the pivots.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. Apparatus for removably attaching a fine material pan to a manure spreader or the like wherein said spreader has sides, a bottom and an open rear discharge end, said sides having extensions projecting rearwardly beyond said bottom, rotary scattering mechanism journalled on said extensions for rotation relative thereto about a horizontal transverse axis, and wherein said pan has a leading end and a trailing end and is adapted to extend rearwardly from said spreader bottom in underlying relation to said rotary scattering mechanism, said attaching apparatus comprising a pivot member, an open socket member, means mounting one of said members on said pan adjacent the trailing end thereof, means mounting the other of said members on one of said spreader side extensions rearwardly of said scattering mechanism axis, said pivot member being movable into and out of engagement with said open socket member upon movement of said pan forwardly and rearwardly relative to said extensions, said pan being vertically swingable about said pivot member between a raised operative position and a lowered inoperative position when the pivot member is in engagement with said socket member, latch means operable when said pan is in raised position to connect said pan to said one of said side extensions forwardly of said open socket member and prevent both swinging movement of said pan relative to said pivot member and rearward movement of said pan relative to said side extensions, and manually operable means for releasing said latch means to free said pan for both vertical swinging movement downwardly to said inoperative position and rearward movement relative to said side extensions to disengage said pivot member from said socket member.

2. Apparatus for removably attaching a fine material pan to a manure spreader or the like wherein said spreader has sides, a bottom and an open rear discharge end, said bottom having a rear terminal edge at said discharge end, said sides having extensions projecting rearwardly beyond said bottom rear terminal edge, and rotary scattering mechanism extending between and journalled on said side extensions rearwardly of said bottom terminal edge for rotation about a horizontal axis parallel to said edge, and wherein said pan has a leading end and a trailing end and is adapted to extend between said side extensions rearwardly from said spreader bottom terminal edge in underlying relation to said rotary scattering mechanism, said attaching apparatus comprising a pivot member, an open socket member, means mounting one of said members on said pan adjacent the trailing end thereof, means mounting the other of said members on one of said spreader side extensions rearwardly of said scattering mechanism axis, said pivot member being movable into and out of engagement with said open socket member upon movement of said pan forwardly and rearwardly relative to said side extensions, said pan being vertically swingable about said pivot member between a raised operative position and a lowered inoperative position when the pivot member is in engagement with said socket member, co-acting latch means on said pan adjacent said leading end thereof and on said one of said side extensions forwardly of said scattering mechanism axis inter-engageable when said pan is in raised operative position to fix the leading end of said pan to said one of said side extensions forwardly of said scattering mechanism axis and prevent both swinging movement of said pan relative to said pivot member and rearward movement of said pan relative to said side extensions, and manually operable means for disengaging said latch means to free said pan for both vertical swinging movement downwardly to said inoperative position and rearward movement relative to said side extensions to disengage said pivot member from said socket member.

3. Apparatus for removably attaching a fine material pan to a manure spreader as recited in claim 2 wherein said pivot member is a rod extending transversely across the trailing end of said pan and projecting laterally beyond each side of the pan, said rod constituting a structural member of the pan.

4. Apparatus for removably attaching a fine material pan to a manure spreader as recited in claim 3 wherein said socket member is one of a pair of socket members respectively carried by said spreader side extensions and each of which comprises a bracket depending from one of said side extensions and having a rearwardly opening generally U-shaped slot therein, said slot being of a size to readily receive said rod therein.

5. Apparatus for removably attaching a fine material pan to a manure spreader as recited in claim 2 wherein said co-acting latch means on said pan and on said one of said side extensions comprises a latch bar carried by said pan adjacent said leading end thereof and extending generally parallel to said spreader bottom rear terminal edge, pivot means connecting said bar to said pan for swinging movement in the fore-and-aft direction relative to said spreader, spring means interconnected between said bar and said pan and yieldably urging said bar in the aft direction about said pivot means, a bracket depending from said one of said side extensions forwardly of said scattering mechanism axis, said bracket having a forwardly opening generally U-shaped slot therein of a size to readily receive said latch bar, and cam means on said bracket adjacent said slot to engage said bar and guide it into said slot in response to swinging of said pan from its said lowered inoperative position to its said raised operative position.

6. Apparatus for removably attaching a fine material pan to a manure spreader as recited in claim 2 wherein an elongated bracket member depends from said one of said spreader side extensions, said open socket member and said co-acting latch means on said one of said side extensions constituting separate U-shaped slots in said elongated bracket member, said bracket member having a forward edge disposed ahead of said scattering mechanism axis and a rear edge disposed rearwardly of said scattering mechanism axis, said latch means U-shaped slot opening forwardly and extending rearwardly from said bracket forward edge and said socket U-shaped slot opening rearwardly and extending forwardly from said bracket rear edge.

References Cited by the Examiner
UNITED STATES PATENTS

| | | | |
|---|---|---|---|
| 1,820,528 | 8/1931 | Claar | 275—3 |
| 1,856,417 | 5/1932 | Hyland | 275—5 |
| 2,484,800 | 10/1949 | Acton | 275—5 |

ABRAHAM G. STONE, *Primary Examiner.*

J. R. OAKS, *Assistant Examiner.*